United States Patent
Kann et al.

(10) Patent No.: US 8,543,726 B1
(45) Date of Patent: Sep. 24, 2013

(54) WEB RELAY

(75) Inventors: Jong J. Kann, Santa Clara, CA (US);
Pierre P. Rafiq, Santa Clara, CA (US);
Marco A. Murgia, Los Gatos, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1630 days.

(21) Appl. No.: 11/101,797

(22) Filed: Apr. 8, 2005

(51) Int. Cl.
*G06F 15/173* (2006.01)
*G06F 15/16* (2006.01)
*G06F 9/00* (2006.01)

(52) U.S. Cl.
USPC .......................... 709/238; 709/219; 726/12

(58) Field of Classification Search
USPC ................... 713/150, 182; 726/12; 709/219, 709/238
See application file for complete search history.

(56) References Cited

U.S. PATENT DOCUMENTS

| | | | |
|---|---|---|---|
| 5,987,611 A * | 11/1999 | Freund | 726/4 |
| 7,200,644 B1 * | 4/2007 | Flanagan | 709/219 |
| 2001/0023442 A1 * | 9/2001 | Masters | 709/227 |
| 2002/0069105 A1 * | 6/2002 | do Rosario Botelho et al. | 705/14 |
| 2002/0069241 A1 * | 6/2002 | Narlikar et al. | 709/203 |
| 2002/0128925 A1 * | 9/2002 | Angeles | 705/26 |
| 2002/0147813 A1 * | 10/2002 | Teng et al. | 709/225 |
| 2002/0161904 A1 * | 10/2002 | Tredoux et al. | 709/229 |
| 2003/0101338 A1 * | 5/2003 | Mullen et al. | 713/152 |
| 2003/0182357 A1 * | 9/2003 | Chess et al. | 709/203 |
| 2005/0198332 A1 * | 9/2005 | Laertz et al. | 709/229 |
| 2005/0267952 A1 * | 12/2005 | Ricciardi et al. | 709/220 |
| 2006/0112174 A1 * | 5/2006 | L'Heureux et al. | 709/223 |

* cited by examiner

*Primary Examiner* — Noel Beharry
(74) *Attorney, Agent, or Firm* — Foley and Lardner LLP; Christopher J. McKenna

(57) ABSTRACT

A method, system, and apparatus are presented in which a web relay/client proxy module is downloaded to a client browser from a Network Security Appliance (NSA). The web relay module intercepts requests from the browser for network resources, and redefines the addresses within those requests so that the NSA can access protected resources on behalf of the client.

27 Claims, 5 Drawing Sheets

WEB RELAY

BACKGROUND

In networked computing systems utilizing a proxy, data requests including Uniform Resource Locators (URLs) generated by client systems are sometimes rewritten by a server based proxy or network security device so as to have all requests directed to a single source. As an example, network security can be increased by having all URLs rewritten to a network security device that has permission to request resources from a protected resource or which can redirect the requests to a public resource. In this application the network security device or server based proxy rewrites all URLs or other data requests in order to force the client system to obtain data through the network security device.

The disadvantage with this approach is that the server based proxy or network security device may be required to rewrite URLs and other network resource requests in context as part of the data being transmitted from a resource. For example, a network security device or other server based proxy may rewrite URLs in a requested web page such that the URLs received by the client system will reference the network security device rather than a protected resource. For absolute URLs within a web page such rewriting can be readily accomplished, but for relative URLs or addresses constructed from code to be executed on the client system (e.g. Java scripts, applets, or other executable code transmitted as part of the web page) accurate rewriting cannot always be accomplished. What is required is a method and system for rewriting URLs and other network resource addresses in a manner that does not require determination of the URLs prior to the request for that URL being made by a client, and which can in general relay requests to an appropriate network security device, corporate proxy, or public resource.

SUMMARY

The present method and system provides for utilization of a web relay system that can serve as a client proxy capable of intercepting requests for network resources generated by a client system (such as a web browser) and rewriting or redirecting those requests based on rules contained within the web relay system. In one embodiment the web relay system is distributed by a Network Security Appliance (NSA) which maintains the appropriate set of rules, and which receives the redefined requests. The NSA may also be capable and authorized to obtain protected network resources that the client system does not have direct access to.

By redefining (through redirection or rewriting) requests containing data request addresses or locations at the point of creation such as at the client side browser, it is possible to force all requests to the appropriate resource, which in many instances is the NSA or corporate proxy.

One feature of the present method and system is that requests intercepted by the web relay system contain network addresses in what can be considered to be an http primitive form in that they are directly useable and do not need to be further compiled or calculated. This is in contrast to systems that attempt to rewrite or redirect network requests prior to interpretation or execution, where the address may not be identifiable or where the final address has yet to be determined.

The method and system described herein provides the function of web relay in that requests for resources are redefined by the web relay system/client proxy and thus relayed to the appropriate source (protected or public, proxied or directly accessible).

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DETAILED DESCRIPTION OF PREFERRED EMBODIMENTS

Figure 1:
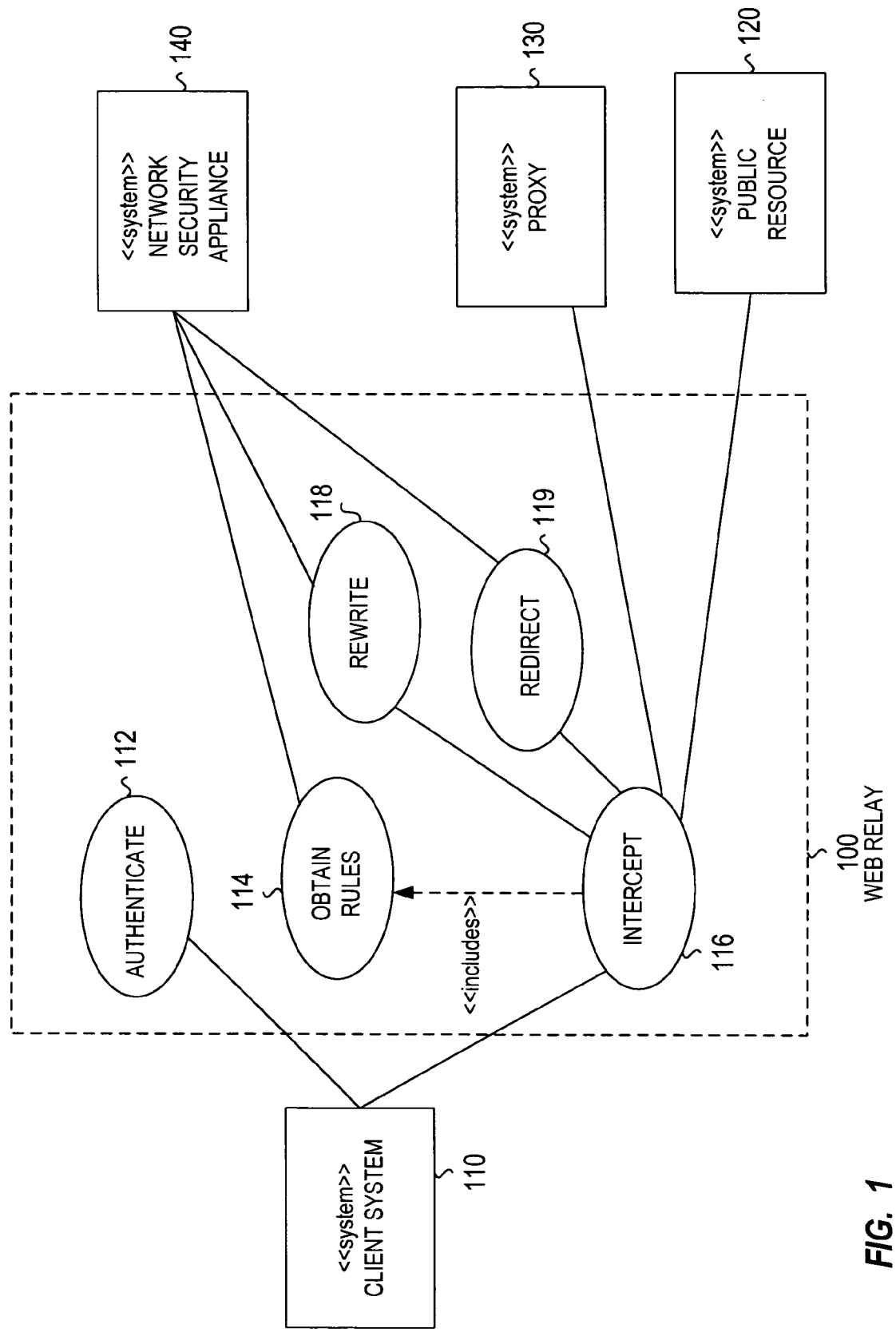
FIG. 1 illustrates a Unified Modeling Language (UML) use case diagram describing a web relay system in its environment.

In describing various embodiments illustrated in the drawings, specific terminology will be used for the sake of clarity. However, the embodiments are not intended to be limited to the specific terms so selected, and it is to be understood that each specific term includes all technical equivalents which operate in a similar manner to accomplish a similar purpose.

FIG. 1 illustrates a use case diagram for the web relay/client proxy system, shown as Web Relay 100. The use case diagram presented herein is based on use of standard Unified Modeling Language (UML) notation and is presented as an aid to understanding the system but does not limit its implementation or use.

Referring to FIG. 1 a Client System 110 can go through an Authenticate process 112 in which the Client System 110 or a user of the Client System 110 is authenticated by a Network Security Appliance (NSA) 140. In one embodiment the NSA 140 is a separate unit that resides on the premises of a commercial establishment that contains servers that are protected resources. In an alternate embodiment, NSA 140 is located remotely from protected resources, but accesses content on those protected servers via network connections. In one embodiment the Authenticate process 112 is accomplished by presenting the user with a logon screen through which they enter a user ID and a password. Alternate forms of authentication can be used in which a user of the Client System 110 or the Web Relay 100 itself provide information which allows NSA 140 to authenticate the user or Client System 110. Such forms of authentication can include, but are not limited to, multiple passwords and hierarchies of security, passcards, keys, codes, and biometric identification.

As illustrated in FIG. 1 an Obtain Rules process 114 receives rules from NSA 140. These rules provide the basis for redefining data request addresses, and may include logical rules and tests of the types shown in FIGS. 2 and 3, lookup tables, or combinations of logical rules, tests and lookup tables.

As illustrated in FIG. 1, Web Relay 100 intercepts requests for network resources generated by Client System 110 in an Intercept process 116. Intercept process 116 invokes the Obtain Rules process 114 which provides rules stored locally within Web Relay 100 or by obtaining rules from NSA 140. In one embodiment, Web Relay 100 obtains rules through Obtain Rules process 114 upon completion of the Authenticate 112 process, and stores those rules locally for the duration of the session. In an alternate embodiment, rules are distributed to the Web Relay 100 from NSA 140 and remain in memory in Web Relay 100 until they are updated by NSA 140.

The Intercept process 116 illustrated in FIG. 1 causes any request for network resources to be intercepted so that a determination can be made as to how to process the request. In one embodiment browser requests are directed via proxy to the Web Relay 100 which runs as a Java or Active X application in the browser. In an alternate embodiment the Web Relay 100 runs concurrently with the browser. As will be discussed, logical tests and rules such as those presented in FIGS. 2 and 3 can be used to make a determination as to how to process and redirect the request for a network resource.

Figures 5A, 5B:
FIGS. 5A and 5B illustrate rewriting and redirection processes respectively.

The Rewrite process 118 of Web Relay 100 as illustrated in FIG. 1 causes the request for a network resource to be rewritten based on the stored logical tests and rules, resulting in the request being sent out on the network in a manner such that it will be received by NSA 140. FIG. 5A illustrates the rewriting of a request wherein the original Uniform Resource Locator (URL) is rewritten or concatenated with the address of NSA 140 (which in the case of FIG. 5A is the address of caymas. com) to produce an address which results in the original request being made to the NSA which obtains the resource from the originally entered address. As illustrated in FIG. 5A the rewrite may be through a regular http connection or through a secure (https) connection.

The Redirect process 119 results in redirection of requests for certain network resources to either a Proxy 130 or NSA 140. In one embodiment the Redirect process 119 is based on the logical tests and rules such as those illustrated in FIGS. 2 and 3. FIG. 5B illustrates an exemplary redirect process in which the original request is directed to a NSA 140 (in this case shown as having the address of caymas.com). It should be noted that the redirect operation described herein is distinct from the http protocol redirect, with the distinction being that the redirect described herein is based on the interception of the request as opposed to a server based redirect.

In one embodiment the Intercept process 116 can, when use of the Proxy 130 is not required, cause forwarding of requests for network resources directly to a Public Resource 120. In the event that the Intercept process 116 determines that the request must be fulfilled by Proxy 130, the request is redirected by Redirect process 116 to Proxy 130, which then makes the request to Public Resource 130 or any other appropriate resource on behalf of Client System 100.

FIG. 1 in combination with FIGS. 5A and 5B illustrate how addresses may be redefined through the rewriting and redirecting process. When used herein, redefine encompasses the rewriting, redirecting or other transformation of a request for a network resource at an initial address to an alternate address. Requests are not limited to http requests such as get, put, post, delete, and connect but may also be Simple Mail Transfer Protocol (SMTP), Internet Message Access Protocol (IMAP), and Post Office Protocol (POP) requests can also be redefined by Web Relay 100 which, under circumstances where the rewriting, redirecting, or transformation is not http related, acts as a client proxy that is equivalent to a web relay for alternate types of protocols.

Figure 2:
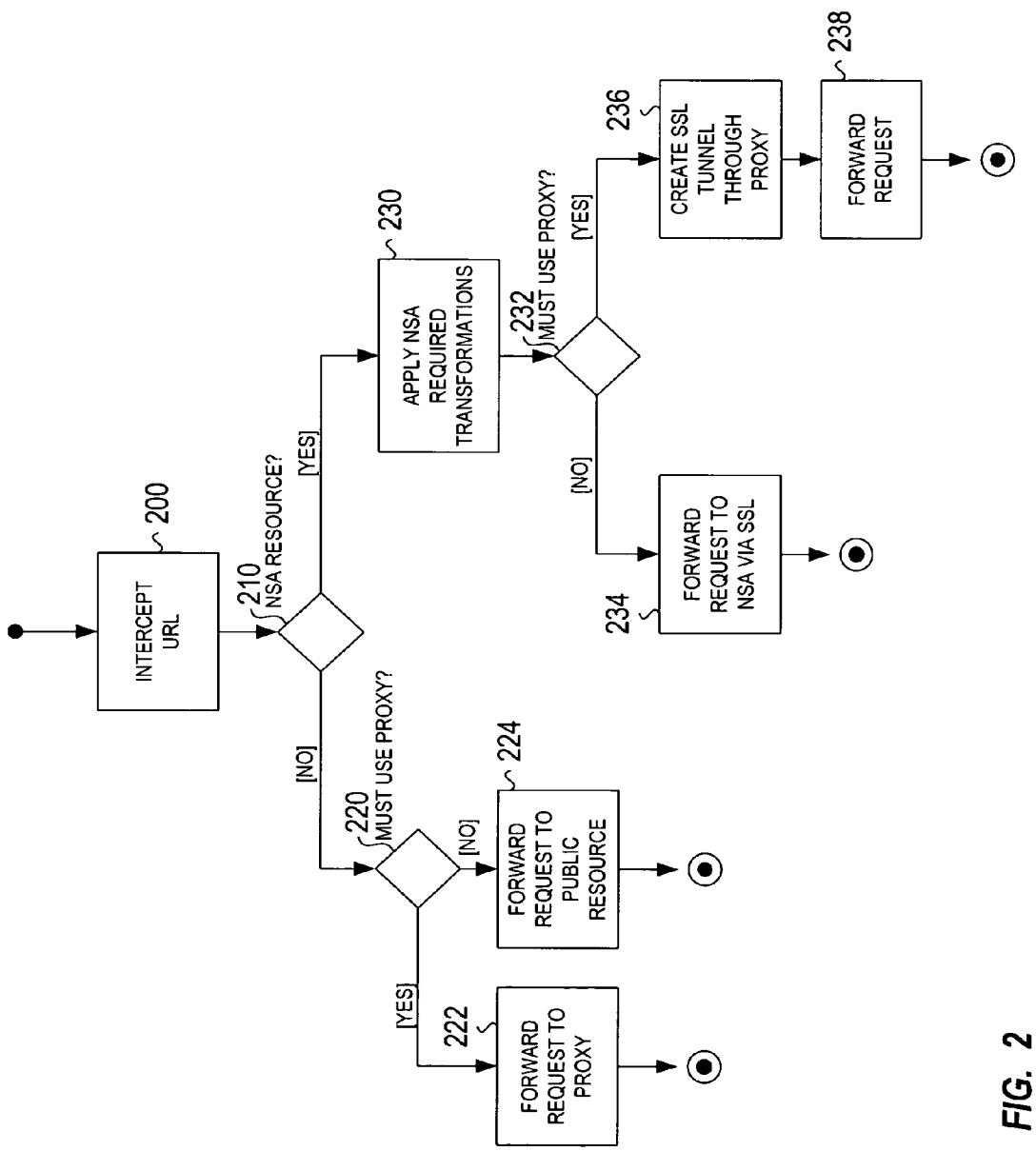
FIG. 2 illustrates an activity diagram for redefining a request based on an intercepted URL.

FIG. 2 illustrates a UML activity diagram that represents exemplary tests and rules for redefining and ultimately forwarding requests for resources to an appropriate server (e.g. proxy, public resource, NSA). As can be seen in FIG. 2 a URL can be intercepted in an Intercept URL step 200. A subsequent NSA Resource test 210 is used to determine if the requested URL is a protected resource only accessible through the NSA. In the event that the requested URL is not a protected resource accessible only through the NSA a subsequent Must Use Proxy test 220 is performed to determine if use of a proxy is required or if the client has permission to directly access the resource. In the event that the resource should only be accessed through the proxy the request is forwarded to the proxy in a Forward Request to Proxy step 222. In the event that a proxy must be used, a Forward Request to Public Resource step 224 occurs.

As is also illustrated in FIG. 2, if the URL request intercepted in Intercept URL step 200 is determined to be a request for an NSA resource in NSA Resource test 210, an Apply NSA Required Transformations step 230 is performed. A subsequent Must Use Proxy test 232 is performed and if it is determined that use of the proxy is not required the request is forwarded to the NSA in a Forward Request to NSA via Secure Socket Layer (SSL) step 234. If it is determined that a proxy must be used in Must Use Proxy test 232, an SSL connection to the proxy is established in a Create SSL Tunnel Through Proxy step 236 and the request is forwarded in the Forward Request step 238.

Figure 3:
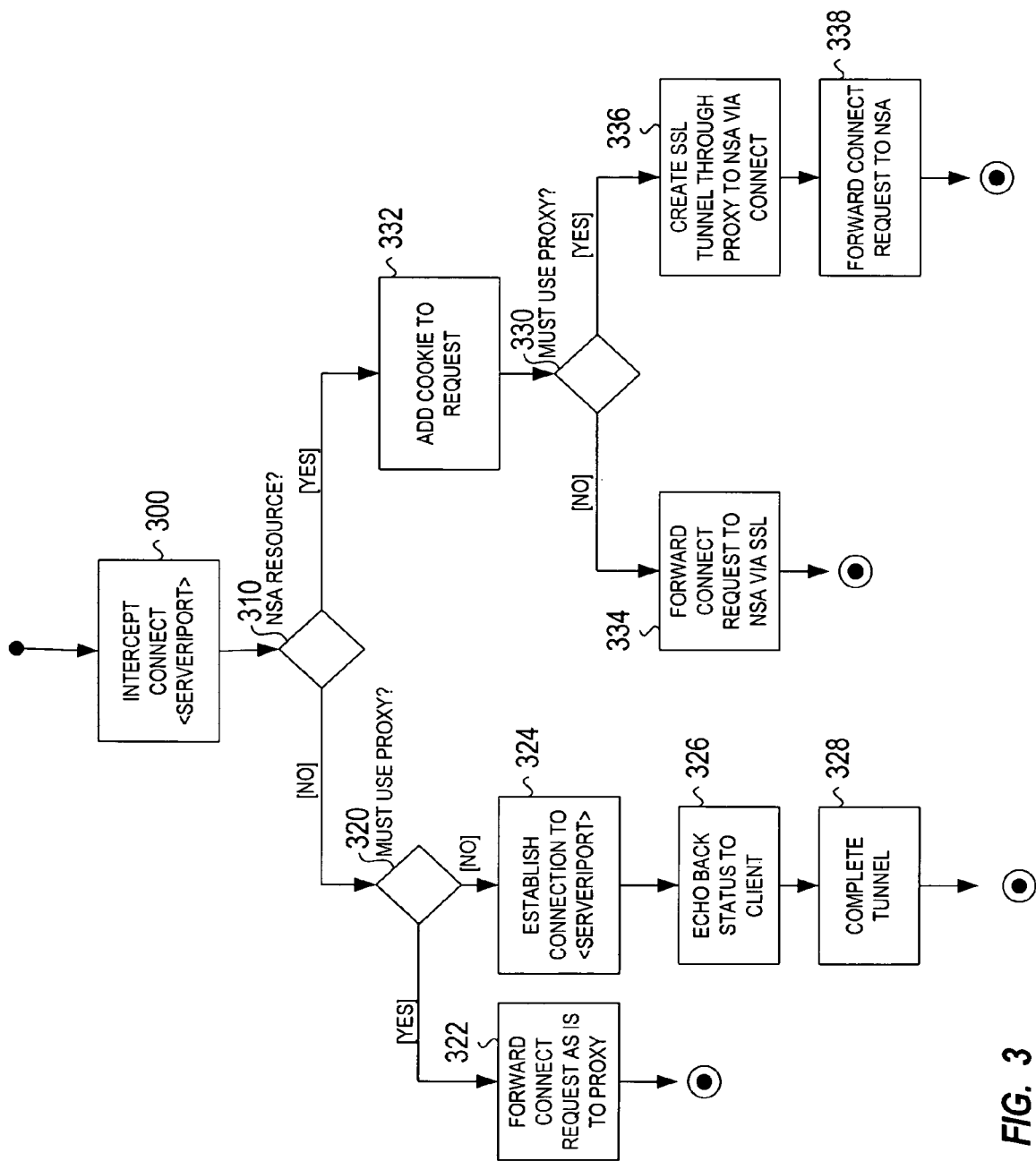
FIG. 3 illustrates an activity diagram for redefining an intercepted connect request.

FIG. 3 illustrates a UML activity diagram that represents exemplary tests and rules for redefining requests for resources, and in particular requests for connections to resources, to the appropriate device or server. The process begins in an Intercept Request step 300 that is followed by a NSA Resource test 310. If the result of the NSA Resource test 310 is 'No', indicating that the connect request is not for a protected/NSA resource, a Must Use Proxy test 320 is performed to determine if the connect request must be completed through the proxy or if it can be established independent of the proxy. In the event that the proxy must be used (a "Yes" result from Must Use Proxy test 320 then the connect request is forwarded to the proxy in a Forward CONNECT Request as is to Proxy step 322. If the answer to the Must Use Proxy test 320 is 'No' then a connection to the server is established in an Establish Connection to <server: port> step 324, and a return message sent in an Echo Back Status to Client Step 326 followed by a Complete Tunnel step 328.

Referring again to FIG. 3 if the result of the NSA Resource test 310 is positive ('Yes') a marker, such as a cookie, can be added in an Add Cookie to Request step 332. Use of a cookie is not required but in one embodiment facilitates subsequent connections to the resource. The Must Use Proxy test 320 is performed, and if it is determined that a proxy is not required the connect request is forwarded in a Forward CONNECT Request to NSA over SSL step 334. If it is determined that a proxy must be used a Create SSL Tunnel Through Proxy to NSA via Connect step 336 occurs followed by a Forward Connect Request step 338.

Figure 4:
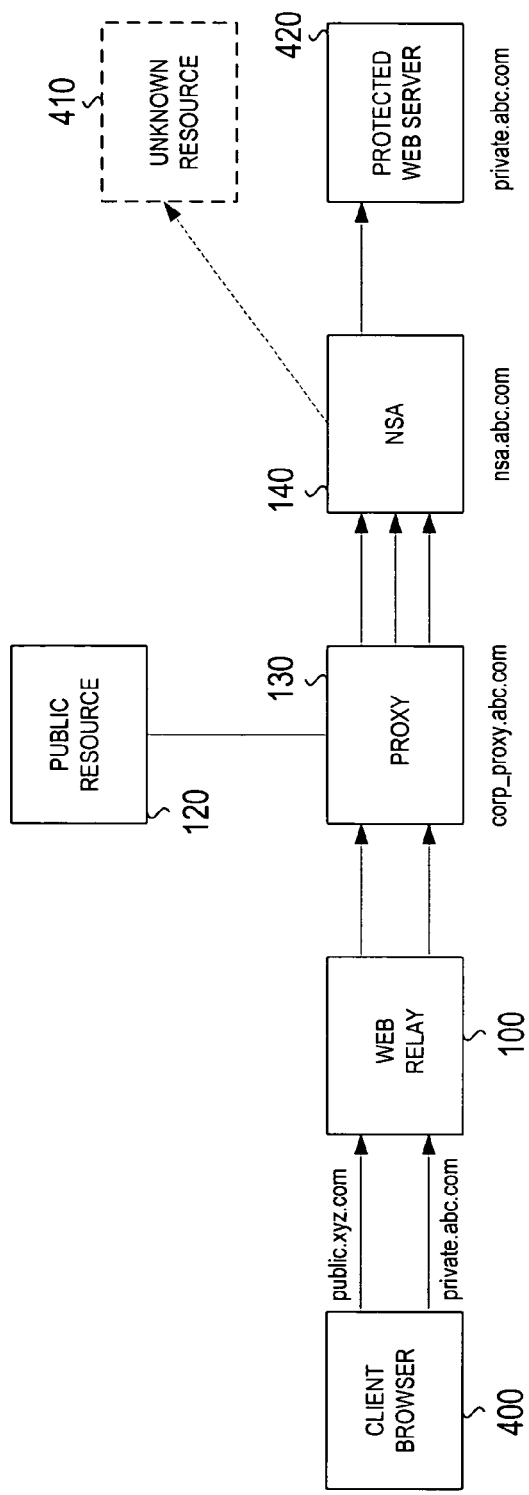
FIG. 4 illustrates an architecture utilizing the client proxy.

FIG. 4 illustrates utilization of the current method and system in which Client System 110 of FIG. 1 is in the form of a Client Browser 400. Web Relay 100 resides on Client Browser 400, and accesses Proxy 130 which can, in one embodiment, be a corporate proxy having an address of the form corp_proxy.abc.com. Proxy 130 also accesses Public Resource 120 which can be a publicly accessible server with an address of the form public.xyz.com. Proxy 130 is connected to NSA 140 which can have an address of the form nsa.abc.com. NSA 140 can access a variety of resources including a Protected Web Server 420, which can have an address of private.abc.com. NSA 140 may also access other resources unknown to the Proxy, represented in FIG. 4 as Unknown Resource 410.

In operation, Client Browser 400 makes requests to resources such as public.xyz.com or private.abc.com. For the architecture shown in FIG. 4 it is implied that a corporate proxy such as Proxy 130 having an address of corp_proxy.abc.com must be used to fulfill all requests made by Client Browser 400. In operation, Web Relay 100 intercepts requests from Client Browser 400 for access to resources such as public.xyz.com and private.abc.com, and determines if these are requests for protected resources (e.g. private.abc.com) in which case the request is forwarded to NSA 140, which fulfills the request. If the request is for a public resource (e.g. public.xyz.com) then Web Relay 100 redirects the request to Proxy 130, which fulfills the request from Public Resource 120 such as public.xyz.com. In an alternate embodiment Web Relay 100 is allowed to access resources directly and contacts Public Resource 120 or NSA 140 without going through Proxy 130.

One of the aspects of the present method and system is that the rewriting, redirecting or other address transformation done by Web Relay 100 preserves the namespace such that cookies do not need to be rewritten. For example, cookies associated with the namespace yahoo.com would not need to be rewritten by Web Relay 100, but can be used in their native namespace/format. The use of the client proxy/web relay preserves the namespace across the cookies, thus eliminating the need for cookie rewrites as well as avoiding cookie entry limitations.

When using Web Relay 100 for file management through the NSA 140 it is possible to create a Windows™ like interface in which users see files in their actual locations (e.g. pp12/testing/results.doc) and are able to drag and drop those files. Because files are accessed directly and names are preserved, auditing in terms of files being accessed and byte counts is more accurate. Because the namespace is preserved, file management done through the browser is a closer approximation of desktop file management.

Although FIG. 1 shows a single network security device (NSA 140) it is possible to have multiple network security appliances in communication with Web Relay 100. In this embodiment, Client Proxy not only redefines requests not only based on the criteria illustrated in FIGS. 2 and 3, but also has knowledge of other network security appliances at other nodes in the network and appropriately directs requests to different nodes based on configuration information residing in Web Relay 100.

Web Relay 100 also insures that end-to-end SSL certification is possible by allowing the user of Client System 110 to receive and view/accept the certificate. Because there is no host rewriting of the address, the certificate is appropriately presented on Client System 110.

In operation, Web Relay 100 can be enabled when a script is run in the browser that enables the proxy. In one embodiment, the script is a Visual Basic™ script that informs ActiveX components in the Internet Explorer™ browser that the Web Relay 100 will act as either an http or https proxy, or both and will tunnel web requests to NSA 140 when the requested network resource (e.g. URL) matches a specified prefix. An exemplary subroutine to perform this task is as follows:

SUBROUTINE for ActiveX TunnelStart
CALL AxtCtrlLogin.AddAppConnect(ConnectionParameter, UserSessionIdentifier)
CALL AxtCtrlLogin.AddProxyUrl(1, 1, "http://10.128.4.78/something/*", 0)
CALL AxtCtrlLogin.AddProxyUrl(1, 2, "http://server 2/*", 0)
CALL AxtCtrlLogin.AddProxyUrl(1, 3, "https://server 3/*", 0)
CALL AxtCtrlLogin.AxtStart( )
END SUBROUTINE.

URL configurations received by Web Relay 100 are compiled into two regular expressions, one for the hostname and one for the path component. Exemplary pseudo-code representing a method for compiling the URL prefix into a regular expression to match the incoming requests to determine if they should be forwarded to NSA 140 is:

PARSE URL for RequestType(http, https)
PARSE URL for Hostname
PARSE URL for Path
WRITE ParsedURL(RequestType, Hostname, Path)
CREATE BinaryRegularExpressions FROM ParsedURL.

In a preferred embodiment the regular expression is in binary form to speed up subsequent matching.

The Web Relay 100 is initiated in order to intercept browser requests. This can be accomplished by invoking Web Relay 100 with an appropriate local address (e.g. the loopback address) and port. The proxy registry within the browser is then appropriately updated so that all requests are directed to the appropriate address/port. Exemplary pseudocode to perform this function is:

INVOKE ClientProxy WITH LocalAddr("127.0.0.1") and LocalPort(65535)
CREATE ListenerSocket WITH LocalAddr and LocalPort
SET ProxyRegistry.

Web Relay 100 is subsequently set up as the proxy server. This can be accomplished by using known functions such as those available in the WinINET library available from the Microsoft Corporation, which allow configuration of the Internet Explorer™ web browser, also offered by the Microsoft Corporation. In one embodiment the form of the "newProxySpec" is "<proto>=server:port", for example, "http=127.0.0.1:65535; https=127.0.0.1:65535; ftp=10.128.4.78:3128". Representative pseudocode to accomplish configuration of the browser is:

SET InternetSetOptionA(NULL, INTERNET_OPTION_PER_CONNECTION_OPTION, &List, nSize)
//The connection settings for other instances of Internet Explorer.
SET InternetSetOptionA(NULL, INTERNET_OPTION_SETTINGS_CHANGED, NULL, 0);
SET InternetSetOptionA(NULL, INTERNET_OPTION_REFRESH, NULL,0).

Once Web Relay 100 has been established as the proxy server for the browser, each incoming request results in a new client request (e.g. CClientRequest) object being created. This can be represented as:

CREATE CClientRequest BASEDON (CClientRequestOwner, Socket, Port).

After enabling reading from the client side (browser) socket, a client request connection object (e.g. CConnectionClient) reads from the socket, and processes the content based on the current state of the request.

READ Socket
CHECK for http header
DISPATCH to serve web request

Once the client side header is fully received, Web Relay 100 can determine whether the incoming
request is for a protected resource. This is accomplished by matching the incoming URL against the regular expressions of all the configured URL prefixes. Representative pseudocode for this function is:

MATCH URL to ProtectedResources

In this embodiment the variable ProtectedResources represents the list of resources that cannot be directly accessed by Client System 110 (or Client Browser 400) but which must be accessed through NSA 140.

Regardless of whether or not the URL is matched to protected resources, Web Relay 100 establishes a connection to the appropriate resource and issues the web request on behalf of the client. For matched https resources, a secure tunnel is established to NSA 140. For matched http resources, the requested URL is rewritten by Web Relay 100 to a "secure proxy" URL of the type illustrated in FIG. 5A. Pseudo-code to establish the https or http connection is:

IF URL is https CONNECT to NetworkSecurityApplicance
IF URL is http REWRITE as RewrittenURL(NetworkSecurityApplicanceURL AND ParsedURL)
REQUEST RewrittenURL.

A response will be received from the resource through a CConnectionServer object. Upon receipt the header is modified (to represent the original resource URL) and sent back to Client System 110 (e.g. Client Browser 400) for presentation along with the content of the response. Pseudocode representing publication of the original URL and display of the contents is:

RETURN ModifiedHeader
DISPLAY UnmodifiedContents

Although the description given herein illustrates use of the Internet Explorer™ browser offered by the Microsoft Corporation, other browsers (such as FireFox™ offered by the Mozilla Foundation) can be utilized, and utilities such as Proxy Auto Config (PAC) can be used to configure the browser such that Web Relay 100 serves as a proxy. Code to accomplish the functions described herein can be written in a variety of programming languages known to those skilled in the art including, but not limited to, C, C++, and Java. Other non-browser code providing network communications and receiving network requests for resources can serve as Client System 110, with Web Relay 100 implemented in conjunction Client System 110.

In an alternate embodiment elements of the operating system such as Proxy Auto Config (PAC) can be used to filter requests before they are redirected. In this embodiment the PAC or equivalent service becomes part of the Web Relay 100 in that some filtering is performed by the operating system before the redefining takes place.

NSA 140 can be developed on a number of computing platforms including, but not limited to, single processor systems based on the Intel Pentium™ series of processors offered by the Intel Corporation as well as other single and multiprocessor systems on which networking functionality can be built.

When used herein, the term "web relay" can be considered to be equivalent to "client proxy" and applies both to http and other protocols in which rewriting, redirecting, or redefining takes place. As previously described, the web relay/client proxy allows for appropriate routing of request to obtain protected, proxied, and public resources.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A method for redirecting, by a web relay, requests of a client to a network security appliance, the method comprising:

a) intercepting, by a web relay of a client, a request of the client for a resource of a server, the client in communication with a network security appliance, the network security appliance intermediary to the client and the server, the request comprising a uniform resource locator (URL) of the server;

b) determining, by the web relay based on one or more rules received from the network security appliance, that the resource of the server is a protected resource that is not to be directly accessed by the client but must be accessed only via the network security appliance;

c) establishing, by the web relay responsive to the determination, a secure tunnel to the network security appliance;

d) rewriting, by the web relay prior to transmission from the client, the request destined to the server for transmission to the server via the network security appliance, the request rewritten to preserve a namespace of a cookie of the request by concatenating an address of the network security appliance with the uniform resource locator (URL) of the server of the request while not rewriting the cookie, the network security appliance using the URL of the server from the rewritten request for obtaining the resource; and e) communicating, by the web relay, the rewritten request and the preserved cookie to the network security appliance.

2. The method of claim 1, wherein step (a) further comprises intercepting, by the web relay executing in a browser of the client, the request comprising one of a uniform resource locator (URL) or a Hyper Text Transfer Protocol (HTTP) request.

3. The method of claim 1, wherein step (b) further comprises determining, by the web relay, that the resource of the request is on a list of resources that cannot be directly accessed by the client but is required to be accessed through the network security appliance.

4. The method of claim 1, wherein step (b) further comprises determining, by the web relay, that the resource of the request is a resource on a server of a private network accessed via the network security appliance.

5. The method of claim 1, wherein step (c) further comprises establishing, by the web relay for the request intercepted via a non-secure connection, a Secure Socket Layer (SSL) connection with the network security appliance.

6. The method of claim 1, wherein step (c) further comprises establishing, by the web relay of a browser responsive to intercepting an HTTP request of the client for a protected resource, a secure HyperText Transfer Protocol (HTTPS) with the network security appliance.

7. The method of claim 1, wherein step (d) further comprises rewriting, by the web relay, the uniform resource locator (URL) of the request to a secure proxy URL.

8. The method of claim 1, wherein step (d) further comprises rewriting, by the web relay, the request to comprise a network address of the network security appliance.

9. The method of claim 1, wherein step (d) further comprises rewriting, by the web relay, the request to include a cookie.

10. The method of claim 1, wherein step (c) further comprises determining, by the web relay, the client is required to use a proxy to access the resource, and establishing the SSL connection through the proxy.

11. The method of claim 10, wherein step (e) further comprises forwarding, by the web relay, the rewritten request to the network security appliance via the proxy.

12. A method for redirecting, by a web relay, requests of a client to one of a proxy or a network security appliance, the method comprising:
  a) intercepting, by a web relay of a client, requests of the client for one or more resources of a server, the web relay in communication with a proxy and a network security appliance, the web relay determines whether to transmit intercepted network requests to the proxy or the network security appliance, the request comprising a uniform resource locator (URL) of the server;
  b) determining, by the web relay based on one or more rules received from the network security appliance, that a first request intercepted from the client is for a protected resource that is not to be directly accessed by the client but must be accessed via the network security appliance;
  c) establishing, by the web relay responsive to the determination of the first request, a secure tunnel to the network appliance and communicating the first request rewritten to preserve a namespace of a cookie of the request via the secure tunnel to the network security appliance by concatenating an address of the network security appliance with the uniform resource locator (URL) of the server of the first request, the network security appliance using the uniform resource locator (URL) of the server from the rewritten first request for obtaining the resource; and
  d) determining, by the web relay based on the one or more rules, that a second request intercepted from the client is not for the protected resource and forwarding the second request to the proxy instead of to the network security appliance.

13. The method of claim 12, wherein step (a) further comprises intercepting, by the web relay executing in a browser of the client, requests communicated via a non-secure connection and comprising one of a uniform resource locator (URL) or a Hyper Text Transfer Protocol (HTTP) request.

14. The method of claim 12, wherein step (a) further comprises determining, by the web relay, whether a resource of an intercepted request is on a list of resources that cannot be directly accessed by the client but is required to be accessed through the network security appliance.

15. The method of claim 12, wherein step (b) further comprises determining, by the web relay, that the resource of the first request is on a server of a private network accessed via the network security appliance.

16. The method of claim 12, wherein step (b) further comprises determining, by the web relay, that the resource of the first request is a protected resource required to be accessed via the network security appliance.

17. The method of claim 12, wherein step (c) further comprises establishing, by the web relay of a browser responsive to the determination of the first request of the client, a secure HyperText Transfer Protocol (HTTPS) with the network security appliance.

18. The method of claim 12, wherein step (c) further comprises rewriting, by the web relay, the uniform resource locator (URL) of the first request to a secure proxy URL.

19. The method of claim 12, wherein step (d) further comprises rewriting, by the web relay, the first request to comprise a network address of the network security appliance.

20. The method of claim 12, wherein step (d) further comprises determining, by the web relay, that the client is required to use the proxy to access the resource of the second request, and establishing a second secure connection through the proxy.

21. A system for redirecting requests of a client to one of a proxy or a network security appliance, the system comprising:
  an interceptor of a web relay intercepting requests of a client for one or more resources of a server via a network, the web relay in communication with a proxy and a network security appliance;
  rules of the web relay to determine whether to use the proxy or the network security appliance for a resource requested by an intercepted request, the rules received from the network security appliance;
  a rewriter of the web relay to rewrite resources of intercepted requests to preserve a namespace of a cookie for the request, based on the rules that identify a resource that is not to be directly accessed by the client but must be accessed only via the network security appliance, for transmission to the network security appliance and concatenating an address of the network security appliance with a uniform resource locator (URL) of the server of the request, the network security appliance using a portion of the URL of the server for obtaining the resource; and
  a redirector of the web relay to redirect the intercepted request to the proxy or the network security appliance based on the rules.

22. The system of claim 21, wherein the web relay determines via the rules that a first request intercepted by the interceptor is for a protected resource to be accessed via the network security appliance.

23. The system of claim 22, wherein the web relay establishes, responsive to the determination for the first request, a secure tunnel to the network appliance and the redirector communicates the rewritten first request via the secure tunnel to the network security appliance.

24. The system of claim 22, wherein the rewriter rewrites a uniform resource locator of the rewritten first request to a secure URL.

25. The system of claim 22, wherein the web relay determines via the rules that the rewritten first request must be forwarded to the proxy via a secure connection.

26. The system of claim 21, wherein the web relay determines via the rules that a second request of the client is not for a protected resource and the redirector forwards the second request to the proxy.

27. The system of claim 21, wherein the web relay operates in a browser of the client.

\* \* \* \* \*

UNITED STATES PATENT AND TRADEMARK OFFICE
CERTIFICATE OF CORRECTION

| | | Page 1 of 1 |
|---|---|---|
| PATENT NO. | : 8,543,726 B1 | |
| APPLICATION NO. | : 11/101797 | |
| DATED | : September 24, 2013 | |
| INVENTOR(S) | : Kann et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1756 days.

Signed and Sealed this
Twenty-fourth Day of February, 2015

Michelle K. Lee
*Deputy Director of the United States Patent and Trademark Office*